US009722890B2

(12) United States Patent
Jahr et al.

(10) Patent No.: US 9,722,890 B2
(45) Date of Patent: Aug. 1, 2017

(54) INTEGRATED INCIDENT MANAGEMENT FOR HYBRID LANDSCAPES (75) Inventors: Andreas Jahr, Karlsruhe (DE); Michael Decker, Wiesloch (DE); Stefan Vormbrock, Wiesloch (DE)

(73) Assignee: SAP SE, Walldorf (DE)

( * ) Notice: Subject to any disclaimer, the term of this patent is extended or adjusted under 35 U.S.C. 154(b) by 373 days.

(21) Appl. No.: 13/328,498

(22) Filed: Dec. 16, 2011

(65) Prior Publication Data

US 2013/0159427 A1   Jun. 20, 2013

(51) Int. Cl.
*G06F 15/16* (2006.01)
*H04L 12/24* (2006.01)

(52) U.S. Cl.
CPC ...... *H04L 41/5064* (2013.01); *H04L 41/5074* (2013.01)

(58) Field of Classification Search
CPC .................................................... G06Q 10/10
See application file for complete search history.

(56) References Cited

U.S. PATENT DOCUMENTS

| 5,349,674 | A  | * | 9/1994  | Calvert ............... G06F 11/0748 |
|           |    |   |         | 709/227                             |
| 6,463,441 | B1 | * | 10/2002 | Paradies                            |
| 7,103,795 | B1 | * | 9/2006  | Hansen ......................... 714/4.1 |
| 2007/0294258 | A1 | * | 12/2007 | Caldwell et al. ............... 707/10 |
| 2008/0016162 | A1 | * | 1/2008  | Meentzen et al. ............ 709/206 |
| 2011/0275364 | A1 | * | 11/2011 | Austin et al. ................. 455/423 |

* cited by examiner

*Primary Examiner* — Viet Vu
(74) *Attorney, Agent, or Firm* — Schwegman Lundberg & Woessner, P.A.

(57) ABSTRACT

Systems and methods to provide integrated incident management for hybrid landscapes are provided. In example embodiments, an incident ticket is received, at a communication hub, from a first component of a first landscape indicating an incident. A second component in a second landscape is determined to which to route incident information including the incident ticket. The determination of the second component is based on an attribute extracted from the incident ticket. The incident information is transmitted to the second component by the communication hub. A solution for the incident ticket is received from the second component based on the second component having the solution or is received from a component of a service backbone based on the component of the service backbone having the solution by the communication hub, and the solution is forwarded to at least one of the first component or the second component.

20 Claims, 7 Drawing Sheets

INTEGRATED INCIDENT MANAGEMENT FOR HYBRID LANDSCAPES

FIELD

The present disclosure relates generally to incident management, and in a specific example embodiment, to providing integrated incident management for hybrid landscapes comprising on-demand services and systems and on-premise systems.

BACKGROUND

Conventionally, when a problem occurs at one of a customer location or a service provider location, an incident ticket is issued. Subsequently, the incident ticket and corresponding communications may be sent from one party to another (e.g., via e-mail) in order to determine a solution for the incident and to appraise all parties regarding the incident. However, not all parties that may need to be involved in solving the problem may receive notification of the incident. The notification may be dictated by the first party that initiated the incident ticket and be based on the first party's determination of who or what systems may need to be involved to solve the problem. The direct notification and exchange of information by the first party is time consuming. Furthermore, in situations where a plurality of incidents occurs, the first party may find it difficult to manage all the incidents.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods for providing integrated incident management for hybrid landscapes are provided. In example embodiments, a customer on-premise landscape and a service provider landscape may exchange incident tickets and related information through a communication hub that manages and tracks all incident communications transmitted through the communication hub. As a result, various users of components of an environment including disparate landscapes (e.g., service provider via a service provider system, key users at an on-demand system, a customer IT department via a customer IT manager 116, on-demand support via an on-demand support system, and on-premise support via an on-premise support system 112) may forward incidents to each other for purposes of incident analysis and resolution. As a result, a customer that is using an end-to-end process comprising different product lines is able to receive support as one integrated service.

By using embodiments of the present invention, a process of reporting incidents is made more efficient, and all proper components are quickly and easily provided notifications, solutions, and confirmation of solutions. Therefore, one or more of the methodologies discussed herein may obviate a need for manual determination and notification of components by the user, which may include notifying incorrect components or forgetting to notify required components. In addition, the end users of the different systems are included appropriately in analyzing and solving the incident which eliminates the need to actively inquire an incident status or to establish an additional communication channel to receive a trigger to providing additional but required information to the incident. This may have the technical effect of reducing computing resources used by one or more devices within the system. Examples of such computing resources include, without limitation, processor cycles, network traffic, memory usage, storage space, and power consumption.

Figure 1:
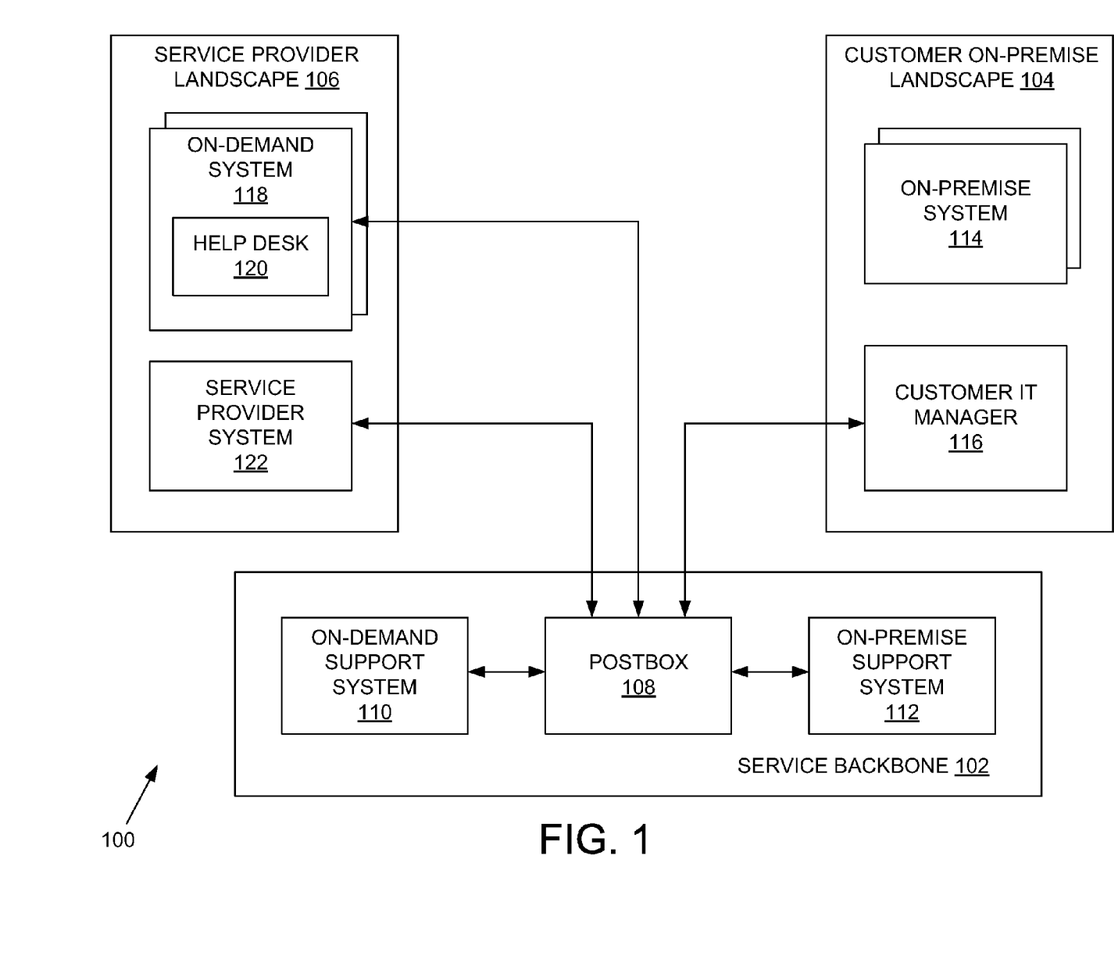
FIG. 1 illustrates an environment in which example embodiments of the inventive subject matter may be practiced.

With reference to FIG. 1, an environment 100 in which example embodiments of the inventive subject matter may be practiced is shown. The environment 100 comprises a service backbone 102 in communication with both a customer on-premise landscape 104 and a service provider landscape 106. The service backbone 102 provides an incident management mechanism to route incident information to appropriate support organizations. In example embodiments, the service backbone may comprise a postbox 108, an on-demand support system 110 and an on-premise support system 112. The postbox 108 is a communication hub through which incident communications (e.g., incident tickets) are routed. The postbox 108 receives all incident tickets, determines proper routing for each incident ticket, and transmits the incident ticket accordingly. The postbox 108 will be discussed in more detail in connection with FIG. 2 below.

The on-demand support system 110 and the on-premise support system 112 provide support for the service provider landscape 106 and the customer on-premise landscape 104, respectively. Additionally, the on-demand support system 110 and the on-premise support system 112 may communicate with each other in order to solve common incidents or incidents that may transcend both landscapes 104 and 106.

The customer on-premise landscape 104 comprises one or more on-premise systems 114 and a customer IT manager 116. The on-premise system 114 may comprise any application, service, or system that is located, managed, and operated at a location of the customer. The customer IT manager 116 is a central platform for application management and collaboration at the customer on-premise landscape 104. The customer IT manager 116 comprises tools and components that provide technical support and monitoring of the on-premise systems 114, as well as request support from other systems of the environment 100. In example embodiments, a customer IT department may utilize tools of the customer IT manager 116 to manage the on-premise system 114.

The service provider landscape 106 comprises one or more on-demand systems 118. The on-demand system 118 is hosted by a service provide. Each on-demand system 118 comprises a network application that provides services and support to a customer without the customer having to host the system. That is, the service provider hosts (e.g., offer, provide, implement, execute, or perform one or more operations of) the systems, and the customer can assess functionalities online through a software as a service (SaaS) model. The on-demand systems 118 may include, for example, services and support for supply chain management, human resource management, customer relationship management (CRM), financial management, compliance management, supplier relationship management, or any other form of business management. Each of the on-demand systems 118 may include a help desk 120, which is a component that allows a key user (e.g., IT manager) at the on-demand system 118 to review an incident that occurs at the on-demand system 118 and determine if the incident should be forwarded to other systems in order to find a solution.

The service provider landscape 106 may further comprise a service provider system 122. The service provider system 122 is an infrastructure of the service provider that manages network applications of the on-demand systems 118.

Figure 3:
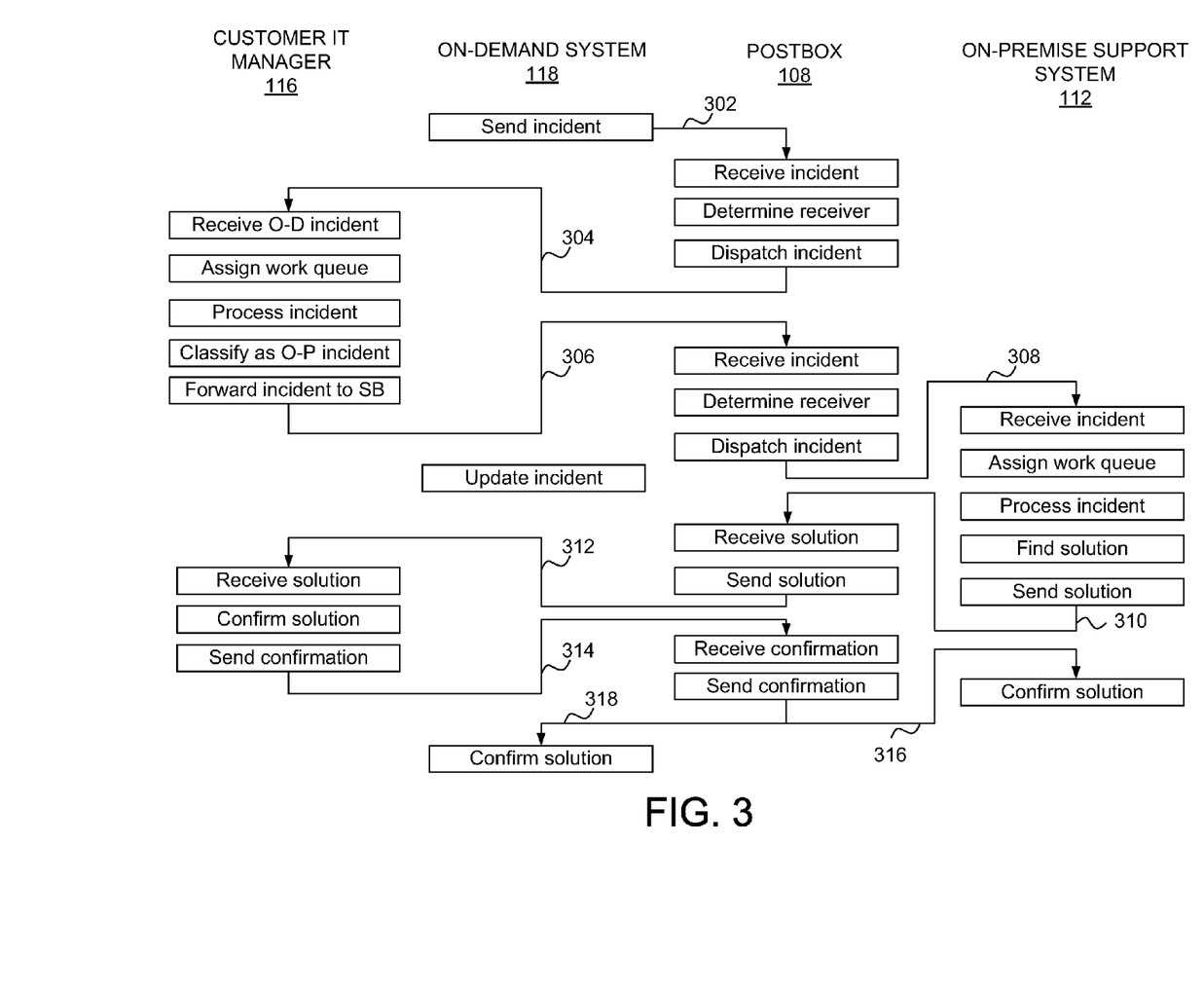
FIG. 3 is a flow diagram of actions between components of the environment for managing an on-demand incident caused by an on-premise issue.
Figure 4:
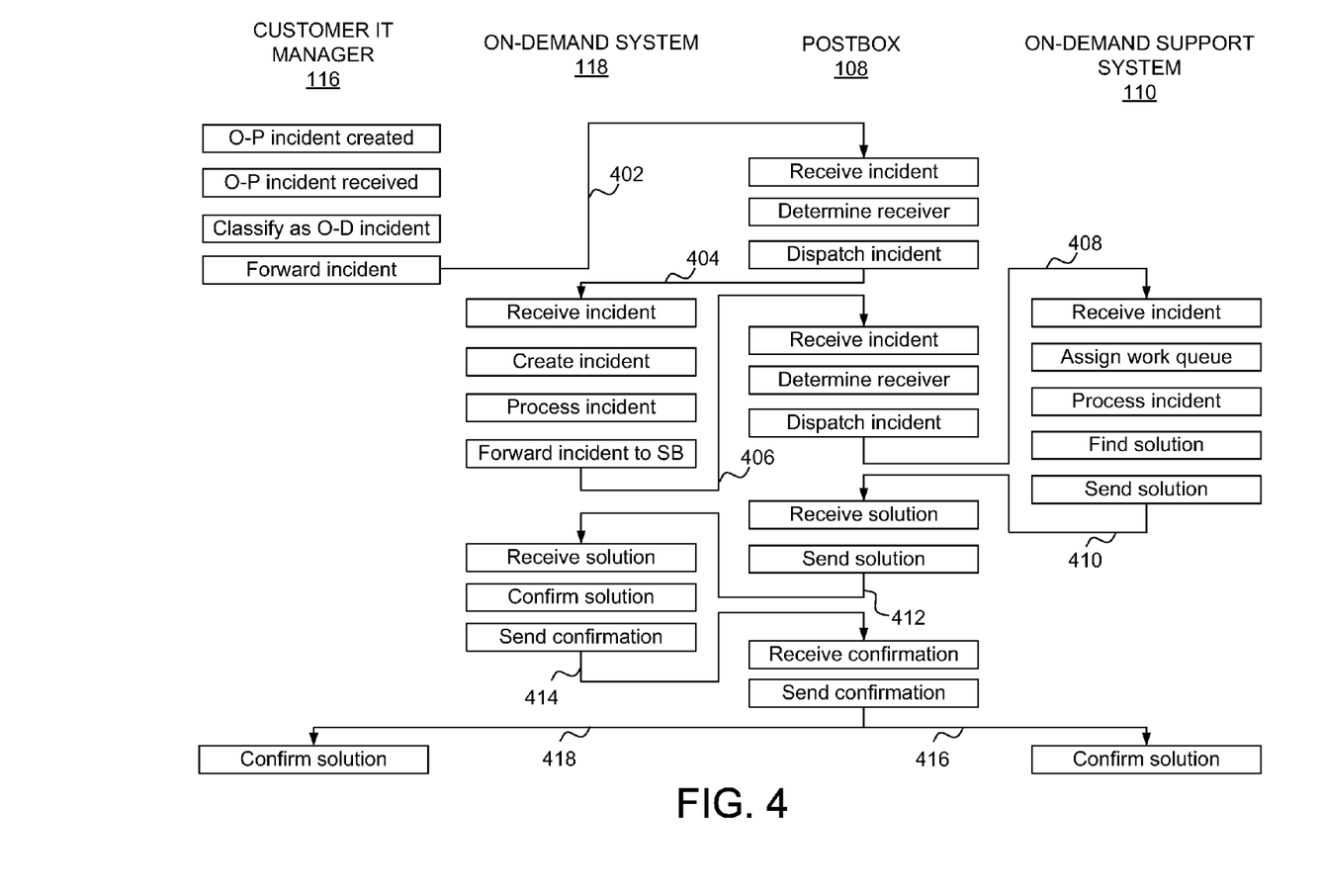
FIG. 4 is a flow diagram of actions between components of the environment for managing an on-premise incident caused by an on-demand system.
Figure 5:
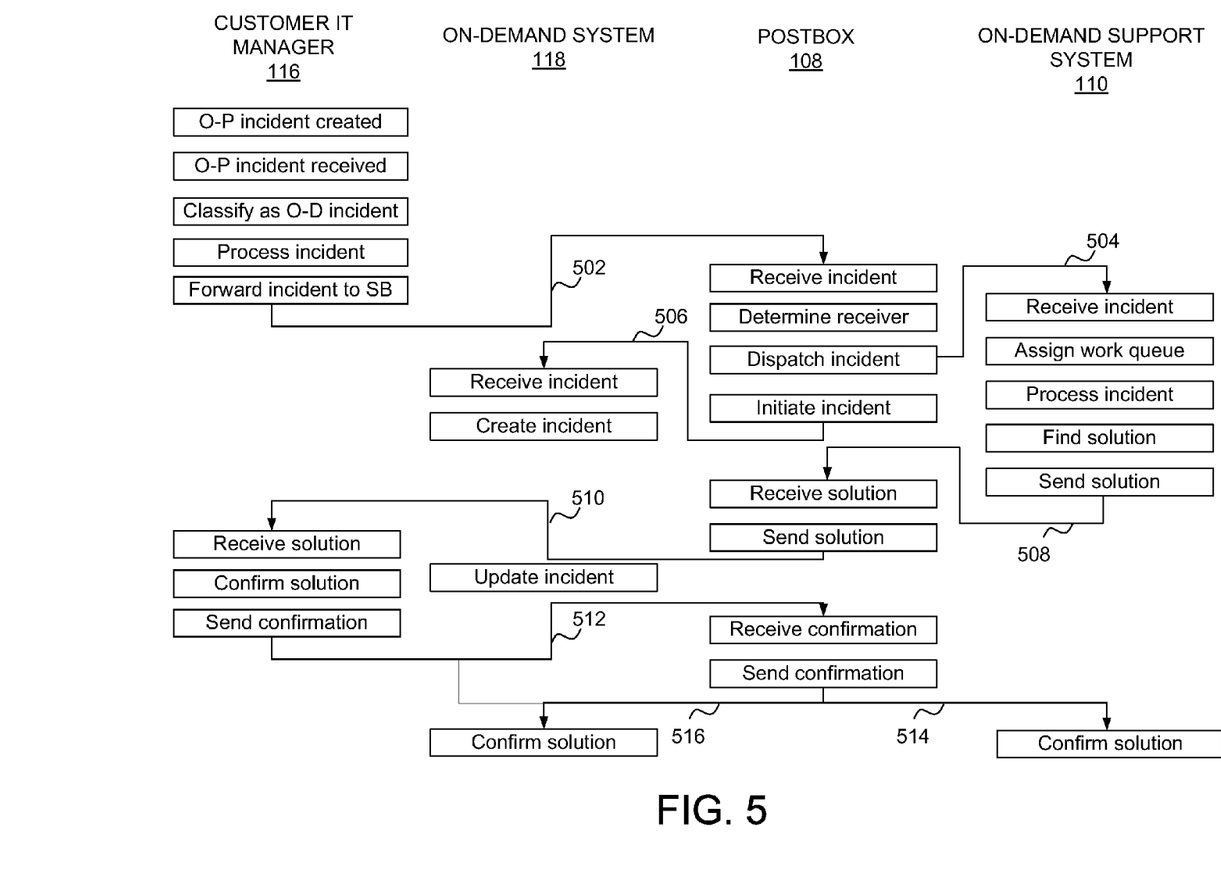
FIG. 5 is an alternative flow diagram of actions between components of the environment for managing an on-premise incident caused by the on-demand system.

The various users of the components of the environment 100 (e.g., service provider via the service provider system 122, the key users at the help desk 120, the customer IT department via the customer IT manager 116, on-demand support via the on-demand support system 110, and on-premise support via the on-premise support system 112) may forward incidents to each other for purposes of incident analysis and resolution. As a result, a customer that is using an end-to-end process comprising different product lines is able to receive support as one integrated service. Examples of the communication routes through the postbox 108 are illustrated in FIG. 3-5. The technical routing carried out by the postbox 108 will be discussed in more detail below.

The various components of the environment 100 may be communicatively coupled together through one or more networks. The networks may comprise, for example, one or more of a wired or wireless network, a local area network (LAN), or a wide area network (WAN).

Figure 2:
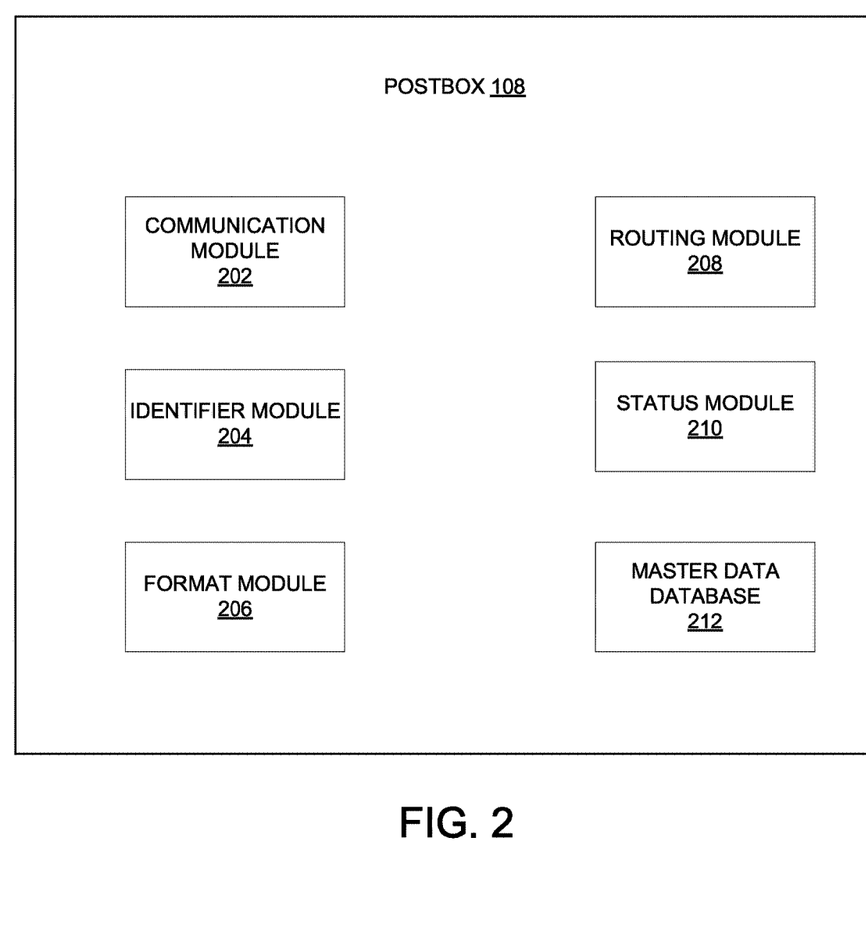
FIG. 2 is a block diagram illustrating a postbox.

FIG. 2 is a block diagram illustrating the postbox 108. The postbox 108 is a communication hub through which incident communications are routed. The postbox 108 receives all incident tickets, determines proper routing for each incident ticket, and transmits each incident ticket accordingly. The postbox 108 also enables transmission of status, question, and response communications related to an incident to all associated parties (e.g., the on-demand support system 110, the on-premise support system 112, the customer IT manager 116, the help desk 120, and the service provider system 122). In example embodiments, the postbox 108 comprises a communication module 202, an identifier module 204, a format module 206, a routing module 208, a status module 210, and a master data database 212 all communicatively coupled together.

The communication module 202 manages the receipt and transmission of communications through the postbox 108 between the various components of the environment 100. The communications may include, for example, incident tickets, questions regarding an incident, responses to questions regarding an incident, and status updates for progress on determining a solution for an incident (herein referred to collectively as "incident information").

The identifier module 204 determines a system identifier and attributes associated with an incident. The system identifier is included in an incident ticket issued for the incident and is extracted by the identifier module 204. In example embodiments, the system identifier may be an identifier within the system data application which identifies, for example, the system experiencing the incident as well as a system type and software releases located on the system.

Using the system identifier as well as other attributes extracted from the incident ticket, the identifier module 204 checks whether the identified system is monitored by, for example, the customer IT manager 116. In an example embodiment, the customer IT manager 116 periodically sends information about the systems managed by the customer IT manager 116 to the postbox 108. This customer IT manager information is stored to the master data database 212. Subsequently, when an incident ticket is received by the communication module 202, the identifier module 204 accesses the information from the master data database 212 for the identified system and determines if the identified system is managed by a particular customer IT manager 116. If the identified system is managed by the customer IT manager 116 and the incident ticket did not originate from the customer IT manager 116, for example, incident information may be sent to the customer IT manager 116 via the communication module 202. A similar process may occur with respect to notifying the service provider system 122.

The format module 206 manages format conversions at the postbox 108. The format module 206 determines a first format in which a communication (e.g., incident ticket) is received. The format module 206 then determines a second format in which another system of the environment 100 requires for its communications. If conversion is necessary, the format module 206 will convert the communication to the proper format for the system. For example, an inbound interface of the customer IT manager 116 may be a different structure than that of the on-demand system 118, and communications that are received from and forwarded to these respective systems are converted by the format module 206.

The routing module 208 manages the routing of the communications at the postbox 108. In example embodiments, the routing module 208 determines where to route incident information based on the system identifier and other attributes associated with the incident and incident ticket. Various routing schemes will be illustrated in connection with FIG. 3-FIG. 5 below.

The status module 210 manages status and status communications between the systems. The status module 210 keeps track of all incident tickets that flow through the postbox 108, and can provide time period or event triggered (e.g., solution determined) status communications between the systems. Status may also include back and forth communications between systems (e.g., questions and responses).

The master data database 212 stores information regarding the various systems in the environment 100. For example, information from the customer IT manager 116 including a system identifier for all systems managed by the customer IT manager 116 may be stored at the master data database 212. Similarly, information from the service provider landscape 106 such as tenant number (e.g., technical entity in which on-demand applications resides) is stored in the master data database 212. Based on the information from the various systems stored in the master data database 212, a match to determine which service provider system 122 and which customer IT manager 116 are connected to each other and an incident may be performed to determine proper routing by the routing module 208. In some cases, the master data database 212 also comprises routing schemes and rules for routing based on various incident types (e.g., incidents occurring at the on-premise system 114 or incidents occurring at the on-demand system 118). While the master data database 212 is shown as a component of the postbox 108, the master data database 212 may be located elsewhere in the service backbone 102 or the environment 100 and be coupled to the postbox 108.

FIG. 3-FIG. 5 provide examples of routing patterns based on different incidents. The examples are provided for illustration purposes. The actions and the routing of communications between the various components of these examples may differ or be varied based on the incident situation.

FIG. 3 is a flow diagram of actions between components of the environment 100 for managing an on-demand incident caused by an on-premise issue. In this incident flow, an incident is detected at the on-demand system 118 for which a local solution is not found. The on-demand system 118 creates an incident ticket. The incident ticket identifies the issue along with the on-demand system 118 and the on-premise system 114 that are affected by the issue when the on-demand system 118 and the on-premise system 114 are coupled to each other to enable business processes across the hybrid landscape. The incident ticket is sent to the postbox 108 (flow 302).

Upon receipt, the postbox 108 determines a receiver for the incident ticket. In example embodiments, the postbox 108 extracts the system identifier and other attributes from the incident ticket to determine matching information from the master data database 212 to determine the receiver. The postbox 108 checks whether the on-premise system 114 is monitored by a particular customer IT manager 116 based on the system identifier and other attributes. In the present example, the customer IT manager 116 is identified using the system identifier. Since the incident is received from the on-demand system 118 and the customer IT manager 116 is unaware that the on-premise system 114 it is managing is affected, the customer IT manager 116 is notified of the incident by the postbox 108 via a communication routed by the routing module 208 (flow 304).

The customer IT manager 116 receives information regarding the incident created on the on-demand system 118 and processes the received incident information. The customer IT manager 116 assigns the incident ticket to a work queue and processes the incident ticket. The processing of incident ticket may determine that the incident is an on-premise incident. The customer IT manager 116 classifies the on-premise incident and forwards the incident ticket to the service backbone 102 (flow 306).

Because all communications are directed through the postbox 108, the postbox 108 receives the communication from the customer IT manager 116 and determines the receiver at the service backbone 102. In this example, the incident is based on an issue with the on-premise system 114. Therefore, the postbox 108 determines that the incident information should be transmitted to the on-premise support system 112 based on information stored in the master data database 212 and dispatches the incident information accordingly (flow 308). At various times during the process, an incident update may be returned to the on-demand system 118 to indicate a current status. The incident update (e.g., status update) may be provided by the postbox 108 based on the postbox's knowledge of the communication flows transmitted through it.

The on-premise support system 112 receives the incident information and processes the incident information. The on-premise support system 112 assigns the incident to a work queue and processes the incident ticket. The processing of the incident ticket may determine a solution for the incident. The solution is then returned to the customer IT manager 116 by way of the postbox 108 (flows 310 and 312). Because the postbox 108 tracks the incident and all communications regarding the incident, the postbox 108 knows to route the solution from the on-premise support system 112 to the customer IT manager 116.

The customer IT manager 116 receives the solution and confirms whether the solution solves the incident. If the solution solves the incident, a confirmation is returned to the postbox 108 (flow 314). In an embodiment where the solution may not be satisfactory, the customer IT manager 116 may send a question to other components of the environment 100 (e.g., on-premise support system 112). Based on the receipt of the confirmation by the post box 108, the postbox 108 sends a confirmation to both the on-premise support system 112 and the on-demand system 118 (flows 316 and 318). The solution may then be applied to rectify the incident.

FIG. 4 is a flow diagram of actions between components of the environment 100 for managing an on-premise incident caused by the on-demand system 118. In this incident flow, an end user at the on-premise system 114 may experience a problem and notify a key user (e.g., IT department) associated with the customer IT manager 116. If the key user cannot solve the issue, an on-premise incident ticket is created at the customer IT manager 116. Because the incident is caused by an issue at the on-demand system 118, in this example, the incident is classified as an on-demand incident, and the incident ticket should be forwarded to the on-demand system 118. The incident ticket is first forwarded to the postbox 108 (flow 402) in accordance with example embodiments.

Upon receipt, the postbox 108 determines a receiver for the incident ticket. In example embodiments, the postbox 108 extracts the system identifier and other attributes from the incident ticket to determine matching information from the master data database 212 and determine the receiver. In the present example, the incident information is routed to the on-demand system 118 (flow 404) by the routing module 208.

The on-demand system 118 receives the incident information and creates a copy of the incident on the on-demand system 118. The on-demand system 118 then processes the incident. In this example, a key user at the on-demand system 118 (e.g., at the help desk 120) may determine that a solution is not available at the on-demand system 118 and that the assistance of the on-demand support system 110 is needed. Therefore, a determination is made to forward the incident information to the service backbone 102. As such, the incident information is sent to the postbox 108 (flow 406) for forwarding to the service backbone 102.

Because all communications are directed through the postbox 108, the postbox 108 receives the communication from the on-demand system 118 and determines the receiver at the service backbone 102. In this example, the incident is based on an issue with the on-demand system 118. Therefore, the postbox 108 determines that the incident information should be transmitted to the on-demand support system 110 and dispatches the incident information accordingly (flow 408).

The on-demand support system 110 receives the incident information and processes the incident information by assigning the incident to a work queue and processing the incident. In one embodiment, the analysis of the incident may be performed by a support user (e.g., employee) at the on-demand support system 110. The analysis of the incident information may result in a solution for the incident. The solution is then returned (e.g., by the support user) to the on-demand system 118 by way of the postbox 108 (flows 410 and 412). Because the postbox 108 tracks the incident and all communications regarding the incident, the postbox 108 knows to route the solution from the on-demand support system 110 back to the on-demand system 118.

The on-demand system 118 receives the solution and a key user of the on-demand system may initiate a confirmation process to determine whether the solution solves the incident. If the solution solves the incident, a confirmation is returned to the postbox 108 (flow 414). In an embodiment where the solution may not be satisfactory, the on-demand system 118 may send a question to other components of the environment 100 (e.g., the on-demand support system 110). Based on the receipt of the confirmation of the solution by the postbox 108, the postbox 108 sends a confirmation to both the on-demand support system 110 and the customer IT manager 116 (flows 416 and 418). The solution may then be applied to rectify the incident.

FIG. 5 is another flow diagram of actions between components of the environment 100 for managing an on-premise incident caused by the on-demand system 118. In this incident flow, an end user at the on-premise system 114 may experience a problem and notify a key user (e.g., IT department) associated with the customer IT manager 116. An on-premise incident ticket is created at the customer IT manager 116 if a local solution cannot be determined. Because the incident is caused by an issue at the on-demand system 118, the incident is classified as an on-demand incident. The incident is locally processed, and if the incident cannot be solved, the incident is forwarded to the service backbone 102 via the postbox 108 (flow 502).

Upon receipt, the postbox 108 determines a receiver for the incident ticket. In example embodiments, the postbox 108 extracts the system identifier and other attributes from the incident ticket to determine matching information from the master data database 212 to determine the receiver. In the present example, the incident information is routed to the on-demand support system 110 (flow 504). Additionally, because the incident is caused by an issue at the on-demand system 118, incident information is sent to the on-demand system 118 (flow 506) to notify the on-demand system 118 of the incident. The on-demand system 118 may then create a copy of the incident.

The on-demand support system 110 receives the incident information and processes the incident information by assigning the incident to a work queue and processing the incident. The processing of incident information may determine a solution for the incident. The solution is then returned to the postbox 108 (flow 508). Because the postbox 108 tracks the incident and all communications regarding the incident, the postbox 108 knows to route the solution from the on-demand support system 110 back to the system that created the incident—the customer IT manager 116 (flow 510). During various times, the on-demand system 118 may be updated with the status of the incident ticket by the postbox 108.

The customer IT manager 116 receives the solution and confirms whether the solution solves the incident. If the solution solves the incident, a confirmation is returned to the postbox 108 (flow 512). In an embodiment where the solution may not be satisfactory, the customer IT manager 116 may send a question to other components of the environment 100 (e.g., the on-demand support system 110) via the postbox 108. Based on the receipt of the confirmation by the post box 108, the postbox 108 sends a confirmation to both the on-demand support system 110 and the on-demand system 118 (flows 514 and 516). The solution may then be applied to rectify the incident.

Figure 6:
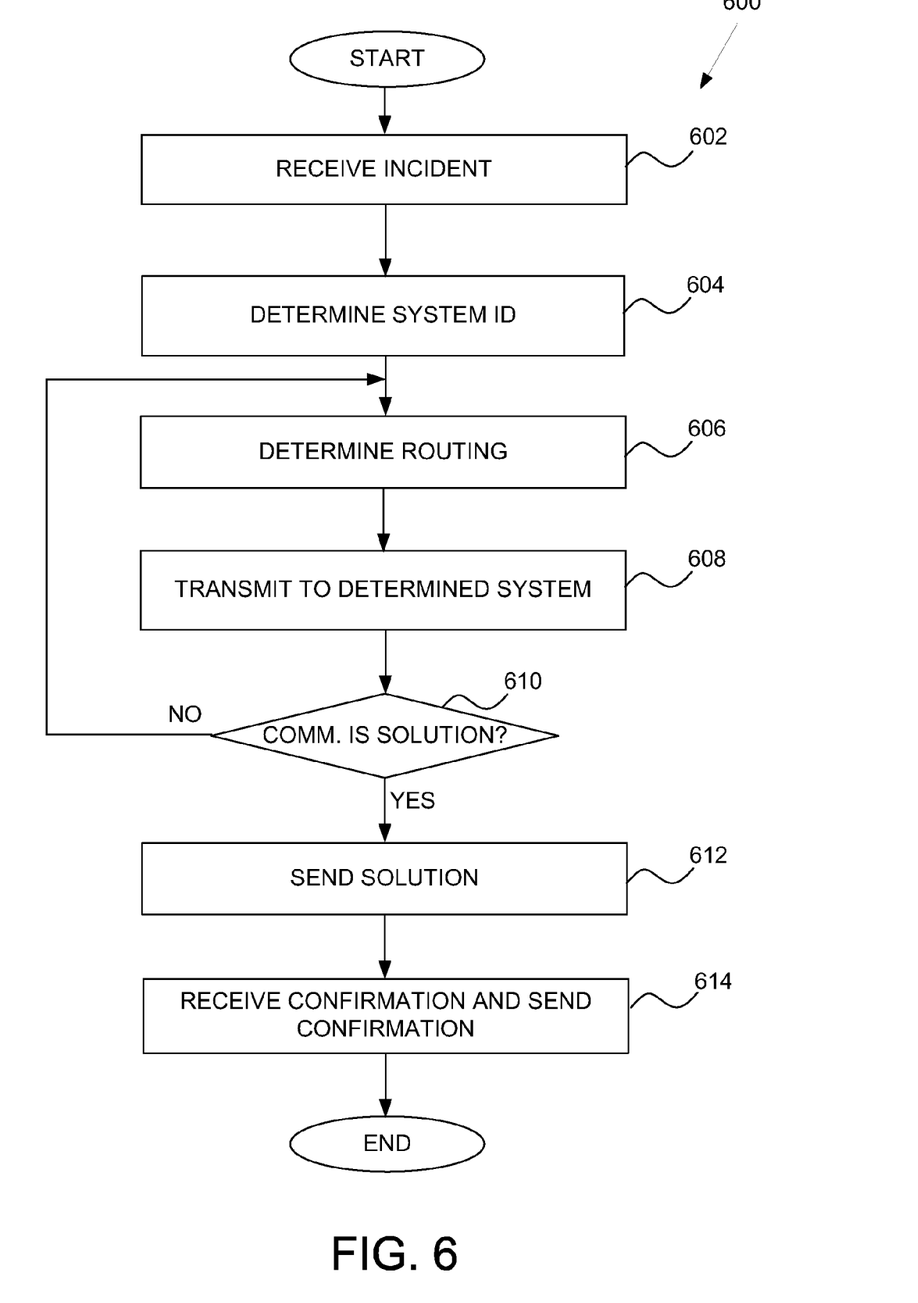
FIG. 6 is a flowchart for providing integrated incident management for hybrid landscapes.

FIG. 6 is a flowchart for providing a method 600 for integrated incident management in hybrid landscapes. In example embodiments, the operations of the method 600 occur at the postbox 108. The postbox 108 is a communication hub through which incident communications are routed. The postbox 108 receives all incident tickets, determines proper routing for each incident ticket and incident related information, and transmits incident information accordingly. In operation 602, an incident ticket is received by the communication module 202. In example embodiments, the incident ticket is received from the landscape (e.g., customer on-premise landscape 104 or service provider landscape 106) that detects the incident and creates the incident ticket.

In operation 604, the identifier module 204 determines a system identifier and other attributes by extracting the system identifier and attributes from the incident ticket. The system identifier may be an identifier within the system data application which identifies the system experiencing the incident as well as a system type and software releases located on the system.

Using the system identifier as well as other attributes from the incident ticket, the routing module 208 determines where to route the incident ticket information in operation 606. For example, if an on-demand incident is caused by an on-premise issue, an incident reported by the on-demand system 118 may be dispatched to the customer IT manager 116 associated with the on-premise system 114 at the customer on-premise landscape 104.

In operation 608, the incident information is transmitted to the determined system by the routing module 208. If the incident information needs to be converted to a format for the transmission, the format module 206 converts the incident information prior to transmission.

All communications regarding the incident are transmitted through the postbox 108. Therefore, in operation 610, a communication is received from a system of the environment 100. If the communication is not a solution, then the postbox 108 determines where to route the received communication (e.g., operation 606). For example, the communication may be a question from one system to another. In another example, the communication may be a communication forwarded from a system to the service backbone 102. The postbox 108 maintains a record of each communication and may utilize the record to determine to which systems to forward these subsequent communications.

If the communication is a solution to the incident, the postbox 108 sends the solution to proper systems of the environment 100 in operation 612. Because the postbox 108 tracks the incident and all communications regarding the incident (e.g., maintains a record of each communication transmission), the postbox 108 knows where to route the solution. For example, if the solution is from the on-premise support system 112, the postbox 108 transmits the solution to the system that created or manages the system that created the on-premise incident (e.g., the customer IT manager 116, the on-demand system 118, or the on-premise system 114).

In operation 614, the postbox 108 receives a confirmation from the system that created the incident or manages the system that created the incident indicating that the solution is acceptable. The confirmation may be forwarded by the postbox 108 to the remaining involved systems of the environment 100 to notify these systems that the solution is found and may be applied (e.g., incident or status update).

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 7:
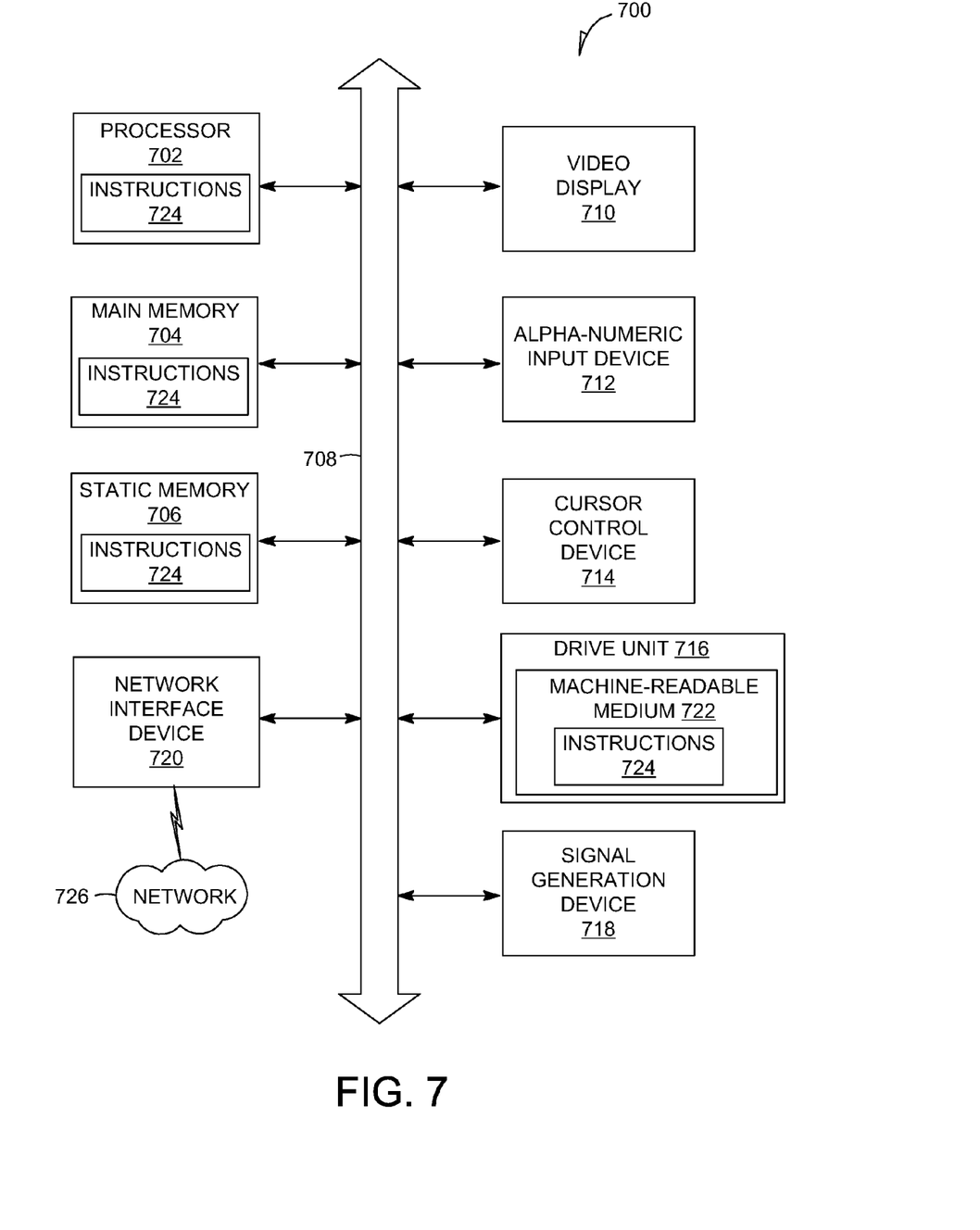
FIG. 7 is a simplified block diagram of a machine in an example form of a computing system within which a set of instructions for causing the machine to perform any one or more of the methodologies discussed herein may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714 (e.g., a mouse), a disk drive unit 716, a signal generation device 718 (e.g., a speaker), and a network interface device 720.

The disk drive unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable storage medium 722 is shown in an exemplary embodiment to be a single medium, the term "machine-readable storage medium" may include a single storage medium or multiple media (e.g., a centralized or distributed database, or associated caches and servers) that store the one or more instructions 724. The term "machine-readable storage medium" shall also be taken to include any tangible medium that is capable of storing, encoding, or carrying instructions for execution by the machine and that causes the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Various examples of systems and methods for providing integrated incident management for hybrid landscapes have been described. In example embodiments, a customer on-premise landscape and a service provider landscape may exchange incident tickets and related information through a communication hub that manages and tracks all incident communications transmitted through the communication hub. As a result, various users of components of an environment including disparate landscapes (e.g., service provider via a service provider system, key users at an on-demand system, a customer IT department via a customer IT manager 116, on-demand support via an on-demand support system, and on-premise support via an on-premise support system 112) may forward incidents to each other for purposes of incident analysis and resolution.

Example 1 is a method that provides integrated incident management for hybrid landscapes. An incident ticket is received, at a communication hub, from a first component of a first landscape indicating an incident. A second component in a second landscape is determined to which to route incident information including the incident ticket. The first landscape and the second landscape comprise a customer on-premise landscape having an on-premise system and a service provider landscape having an on-demand system providing a service to the on-premise system. The determination of the second component is based on an attribute extracted from the incident ticket. The incident information is transmitted to the second component by the communication hub. A solution for the incident ticket is received from a component of a service backbone by the communication hub, and the solution is forwarded to at least one of the first component or the second component.

In example 2, the subject matter of example 1 can optionally include maintaining a record of communications related to the incident ticket.

In example 3, the subject matter of examples 1-2 can optionally include using the record of communications to determine routing of a communication subsequent to the transmission of the incident information.

In example 4, the subject matter of examples 1-3 can optionally include extracting a system identifier, the system identifier being an identifier within a system data application which identifies a system associated with the first component experiencing the incident.

In example 5, the subject matter of examples 1-4 can optionally include using the system identifier to determine the second component to route the incident information by matching the system identifier to component information stored in a database associated with the communication hub.

In example 6, the subject matter of examples 1-5 can optionally include receiving management information from a customer IT manager regarding an on-premise system the customer IT manager manages at the customer on-premise landscape, and storing the management information in a database associated with the communication hub.

In example 7, the subject matter of examples 1-6 can optionally include extracting attributes from the incident ticket, and determining the customer IT manager associated with the customer on-premise landscape affected by the incident.

In example 8, the subject matter of examples 1-7 can optionally include receiving a confirmation for the solution from one component and forwarding the confirmation to remaining components involved with the incident.

In example 9, the subject matter of examples 1-8 can optionally include wherein the first component is a customer IT manager and the second component is an on-demand system, the incident occurring at the on-demand system. The receiving of the solution comprises receiving the solution from an on-demand support system by the communication hub.

In example 10, the subject matter of examples 1-9 can optionally include receiving a confirmation of the solution from one of the on-demand system or the customer IT manager.

In example 11, the subject matter of examples 1-10 can optionally include selecting the component of the service backbone from which to request a solution based on a location of a cause of the incident, the component of the service backbone comprising one of an on-demand support system or an on-premise support system.

In example 12, the subject matter of examples 1-11 can optionally include wherein the first component is the on-demand system and the second component is a customer IT manager, the incident occurring at the on-premise system. The receiving of the solution comprises receiving the solution from the on-premise support system by the communication hub.

In example 13, the subject matter of examples 1-12 can optionally include sending incident status updates to components involved with the incident.

In example 14, the subject matter of examples 1-13 can optionally include formatting a communication including the incident information from a first format of the first component to a second format of the second component.

Example 15 is a system for providing integrated incident management for hybrid landscapes. The system includes a processor of a communication hub, a communication module configured to receive an incident ticket from a first component of a first landscape indicating an incident at a communication hub, a routing module configured to determine, using the processor of the communication hub, a second component in a second landscape to route incident information including the incident ticket, the determining based on an attribute extracted from the incident ticket. The first landscape and the second landscape comprise a customer on-premise landscape having an on-premise system and a service provider landscape having an on-demand system providing a service to the on-premise system. The communication module is further configured to transmit the incident information to the second component, receive a solution for the incident ticket from a component of a service backbone, and forward the solution to at least one of the first component or the second component.

In example 16, the subject matter of example 15 can optionally include an identifier module configured to extract a system identifier, the system identifier being an identifier within a system data application which identifies a system associated with the first component experiencing the incident.

In example 17, the subject matter of examples 15-16 can optionally include a master data database storing management information from a customer IT manager regarding an on-premise system the customer IT manager manages at a customer on-premise landscape.

In example 18, the subject matter of examples 15-17 can optionally include a format module configured to format a communication including the incident information from a first format of the first component to a second format of the second component.

Example 19 is a non-transitory machine-readable medium in communication with at least one processor, the non-transitory machine-readable storage medium storing instructions, which when executed by the at least one processor of a machine, cause the machine to perform operations. The operations include receiving an incident ticket from a first component of a first landscape indicating an incident at a communication hub, determining a second component in a second landscape to route incident information including the incident ticket, the determining based on an attribute extracted from the incident ticket, transmitting the incident information to the second component, receiving a solution for the incident ticket from a component of a service backbone, and forwarding the solution to at least one of the first component or the second component. The first landscape and the second landscape comprise a customer on-premise landscape having an on-premise system and a service provider landscape having an on-demand system providing a service to the on-premise system.

In example 20, the subject matter of example 19 can optionally include extracting a system identifier, the system identifier being an identifier within a system data application which identifies a system associated with the first component experiencing the incident, and using the system identifier to determine the second component to route the incident information by matching the system identifier to component information stored in a database associated with the communication hub.

What is claimed is:
1. A method for integrated incident management of hybrid landscapes, the method comprising:
receiving, at a service backbone by a communication hub, an incident ticket indicating an incident from a first component of a first landscape of the hybrid landscapes, the service backbone comprising the communication hub, an on-demand support system, and an on-premise support system;
extracting, by the communication hub, at least one attribute from the incident ticket, the at least one attribute comprising a system identifier;
determining, using a processor of the communication hub, a second component in a second landscape of the hybrid landscapes to which incident information is to be routed, the determining comprising matching at least the system identifier extracted from the incident ticket to component information in a database to identify the second component in the second landscape that is associated with the first component of the first landscape and the incident in order to determine proper routing of the incident information to the second component, the database including routing schemes and rules for routing the incident information, the first landscape being one of a customer on-premise landscape or a service provider landscape of the hybrid landscapes and the second landscape being a remaining one of the hybrid landscapes, the customer on-premise landscape comprising components located, managed, and operated at a location of a customer, the service provider landscape comprising software-as-a-service (SaaS) components hosted by a service provider that provides services to the customer;
transmitting, by the communication hub, the incident information to the second component determined from the matching of at least the system identifier extracted from the incident ticket to the component information in the database;

determining whether a solution for the incident ticket is available from, the second component or from the service backbone;

in response to the second component having the solution for the incident ticket, receiving, by the communication hub, the solution for the incident ticket from the second component;

in response to the service backbone having the solution for the incident ticket, receiving, by the communication hub, the solution from either the on-demand support system or the on-premise support system within the service backbone, the receiving of the solution from the either the on-demand support system or the on-premise support system being based on a location of a cause of the incident; and forwarding, by the communication hub, the solution to at least one of the first component or the second component.

2. The method of claim 1, further comprising maintaining a record of communications related to the incident ticket.

3. The method of claim 2, further comprising using the record of communications to determine routing of a communication subsequent to the transmission of the incident information.

4. The method of claim 1, wherein the system identifier comprises an identifier within a system data application which identifies a system associated with the first component experiencing the incident.

5. The method of claim 1, further comprising:
receiving management information from a customer IT manager regarding an on-premise system the customer IT manager manages at the customer on-premise landscape; and
storing the management information in the database associated with the communication hub.

6. The method of claim 5, wherein the determining the second component comprises:
matching the attribute extracted from the incident ticket to the customer IT manager associated with the customer on-premise landscape affected by the incident.

7. The method of claim 1, further comprising receiving a confirmation for the solution from one component and forwarding the confirmation to remaining components involved with the incident.

8. The method of claim 1, wherein the first component is a customer IT manager of the customer on-premise landscape and the second component is an on-demand system of the service provider landscape, the incident occurring at the on-demand system, and wherein:
the receiving of the solution comprises receiving the solution from the on-demand support system of the service backbone by the communication hub.

9. The method of claim 8, further comprising receiving a confirmation of the solution from one of the on-demand system or the customer IT manager.

10. The method of claim 1, wherein the solution is received from the on-demand support system based on the location of the cause being at the service provider landscape and the solution is received from the on-premise support system based on the location of the cause being at the customer on-premise landscape.

11. The method of claim 1, wherein the first component is an on-demand system of the service provider landscape and the second component is a customer IT manager of the customer on-premise landscape, the incident occurring at an on-premise system of the customer on-premise landscape, and wherein:
the receiving of the solution comprises receiving the solution from the on-premise support system of the service backbone by the communication hub.

12. The method of claim 1, further co rising sending incident status updates to components involved with the incident.

13. The method of claim 1, further comprising formatting a communication including the incident information from a first format of the first component to a second format of the second component.

14. A system for integrated incident management of hybrid landscapes, the system comprising:
one or more processors of a communication hub configured to perform operations comprising:
receiving, at a service backbone by the communication hub, an incident ticket indicating an incident from a first component of a first landscape of the hybrid landscapes, the service backbone comprising the communication hub, an on-demand support system, and an on-premise support system;
extracting at least one attribute from the incident ticket, the at least one attribute comprising a system identifier;
determining a second component in a second landscape of the hybrid landscapes to which incident information is to be routed, the second component determined by matching at least the system identifier extracted from the incident ticket to component information in a database to identify the second component in the second landscape that is associated with the first component of the first landscape and the incident in order to determine proper routing of the incident information to the second component, the database including routing schemes and rules for routing the incident information, the first landscape being one of a customer on-premise landscape or a service provider landscape of the hybrid landscapes and the second landscape being a remaining one of the hybrid landscapes, the customer on-premise landscape comprising components located, managed, and operated at a location of a customer, the service provider landscape comprising software-as-a-service (SaaS) components hosted by a service provider that provides services to the customer;
transmitting the incident information to the second component determined from the matching of at least the system identifier extracted from the incident ticket to the component information in the database;
determining whether a solution for the incident ticket is available from the second component or from the service backbone;
in response to the second component having the solution for the incident ticket, receiving the solution for the incident ticket from the second component;
in response to the service backbone having the solution for the incident ticket, receiving the solution from either the on-demand support system or the on-premise support system within the service backbone, the receiving of the solution from the either the on-demand support system or the on-premise support system being based on a location of a cause of the incident; and
forwarding the solution to at least one of the first component or the second component.

15. The system of claim 14, wherein the system identifier comprises an identifier within a system data application which identifies a system associated with the first component experiencing the incident.

16. The system of claim 14, wherein the database stores management information from a customer IT manager regarding an on-premise system the customer IT manager manages at the customer on-premise landscape.

17. The system of claim 14, wherein the operations further comprise formatting a communication including the incident information from a first format of the first component to a second format of the second component.

18. A non-transitory machine-readable medium storing instructions, which when executed by at least one processor of a machine, cause the machine to perform operations for integrated incident management of hybrid landscapes, the operations comprising:

receiving, at a service backbone by a communication hub, an incident ticket indicating an incident from a first component of a first landscape of the hybrid landscapes, the service backbone comprising the communication hub, an on-demand support system, and an on-premise support system;

extracting, by the communication hub, at least one attribute from the incident ticket, the at least one attribute comprising a system identifier;

determining a second component in a second landscape of the hybrid landscapes to which incident information is to be routed, the determining comprising matching at least the system identifier extracted from the incident ticket to component information in a database to identify the second component in the second landscape that is associated with the first component of the first landscape and the incident to determine proper routing of the incident information to the second component, the database including routing schemes and rules for routing the incident information, the first landscape being one of a customer on-premise landscape or a service provider landscape of the hybrid landscapes and the second landscape being a remaining one of the hybrid landscapes, the customer on-premise landscape comprising components located, managed, and operated at a location of a customer, the service provider landscape comprising software-as-a-service (SaaS) components hosted by a service provider that provides services to the customer;

transmitting the incident information to the second component determined from the matching of at least the system identifier extracted from the incident ticket to component information in the database;

determining whether a solution for the incident ticket is available from he second component or from the service backbone;

in response to the second component having the solution for the incident ticket, receiving the solution for the incident ticket from the second component;

in response to the service backbone having the solution for the incident ticket, receiving, by the communication hub, the solution from either the on-demand support system or the on-premise support system within the service backbone, the receiving of the solution from the either the on-demand support system or the on-premise support system being based on a location of a cause of the incident; and forwarding the solution to at least one of the first component or the second component.

19. The method of claim 6, wherein the determining the second component comprises determining that the customer IT manager did not originate the incident ticket, and the second component to which incident information is to be routed comprises the customer IT manager based on the customer IT manager not originating the incident ticket.

20. The non-transitory machine-readable medium of claim 18, wherein the operations further comprise:

receiving management information from a customer IT manager regarding an on-premise system the customer IT manager manages at the customer on-premise landscape; and storing the management information in the database associated with the communication hub, wherein the determining the second component comprises:

matching the attribute extracted from the incident ticket to the customer IT manager associated with the customer on-premise landscape affected by the incident, and determining that the customer IT manager did not oriainate the incident ticket, wherein the second component to which incident information is to be routed comprises the customer IT manager based on the customer IT manager not originating the incident ticket.

* * * * *